United States Patent
Kwon et al.

(10) Patent No.: US 10,067,354 B2
(45) Date of Patent: Sep. 4, 2018

(54) MULTI-MODE WATCH AND METHOD FOR OPERATING THE MULTI-MODE WATCH

(71) Applicant: Samsung Display Co., Ltd., Yongin-si, Gyeonggi-Do (KR)

(72) Inventors: Jae-Joong Kwon, Suwon-si (KR); Yun-Seon Do, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/406,158

(22) Filed: Jan. 13, 2017

(65) Prior Publication Data

US 2017/0205636 A1 Jul. 20, 2017

(30) Foreign Application Priority Data

Jan. 15, 2016 (KR) ........................ 10-2016-0005218

(51) Int. Cl.
| | |
|---|---|
| *G04G 9/00* | (2006.01) |
| *G02B 27/28* | (2006.01) |
| *G04C 17/00* | (2006.01) |
| *G02B 27/00* | (2006.01) |

(52) U.S. Cl.
CPC ......... *G02B 27/281* (2013.01); *G02B 27/283* (2013.01); *G04C 17/0091* (2013.01); *G04G 9/00* (2013.01); *G04G 9/0064* (2013.01); *G02B 27/0018* (2013.01)

(58) Field of Classification Search
CPC ........................... G02B 27/281; G02B 27/283; G02B 27/0018; G04G 9/00; G04G 9/0064; G04C 17/0091
See application file for complete search history.

(56) References Cited

U.S. PATENT DOCUMENTS

| | | | |
|---|---|---|---|
| 6,580,479 B1 * | 6/2003 | Sekiguchi | ........... G02F 1/13471 349/114 |
| 6,937,301 B2 * | 8/2005 | Sekiguchi | ........... G02F 1/13471 349/114 |

(Continued)

FOREIGN PATENT DOCUMENTS

| | | |
|---|---|---|
| KR | 10-2004-0081654 A | 9/2004 |
| KR | 10-2004-0095101 A | 11/2004 |
| KR | 10-2013-0043286 A | 4/2013 |

OTHER PUBLICATIONS

Kairos Watches, Kairos Hybrid Watches, https://kairoswatches.com/watches/, 2016.

*Primary Examiner* — Sean Kayes
(74) *Attorney, Agent, or Firm* — Innovation Counsel LLP (57) ABSTRACT

A watch may include a first display unit, a second display unit, a first polarizer set, and a second polarizer set. The second display unit may be positioned over the first display unit and may transmit light. One of the first display unit and the second display unit may display a time information image that indicates time. The other of the first display unit and the second display unit may display non-time information image, e.g., a user interface element. The first polarizer set may be positioned between the first display unit and the second display unit. The second polarizer set may be positioned on the second display unit. One of the first polarizer set and the second polarizer set may rotate relative to the other for enabling the watch to conceal or show the time information image.

20 Claims, 10 Drawing Sheets

(56) References Cited

U.S. PATENT DOCUMENTS

| | | | |
|---|---|---|---|
| 6,995,739 B2* | 2/2006 | Lee ................... | G04B 45/0007 345/4 |
| 2002/0109808 A1* | 8/2002 | Sekiguchi ........... | G02F 1/13471 349/96 |
| 2004/0051722 A1* | 3/2004 | Lee ................... | G04B 45/0007 345/690 |
| 2006/0120222 A1* | 6/2006 | Mazzetti ................ | G04B 19/30 368/223 |
| 2014/0045547 A1 | 2/2014 | Singamsetty et al. | |

\* cited by examiner

MULTI-MODE WATCH AND METHOD FOR OPERATING THE MULTI-MODE WATCH

CROSS-REFERENCE TO RELATED APPLICATION(S)

This application claims priority under 35 USC § 119 to Korean Patent Application No. 10-2016-0005218, filed on Jan. 15, 2016 in the Korean Intellectual Property Office (KIPO); the contents of the Korean Patent Application are incorporated herein by reference.

BACKGROUND

1. Technical Field

The technical field is related to a watch, e.g., a multi-mode watch, and a method for operating the watch.

2. Description of the Related Art

A watch typically provides time information. A modern watch, e.g., a smart watch, may have additional functions and/or provide additional services, such as one or more of a phone function, an e-mail function, a messaging function, a social network service, a music function, a photo function, a camera function, a video function, a near field communication function, a positioning function, etc.

SUMMARY

Some example embodiments may be related to a watch, e.g., a multi-mode watch or hybrid smart watch, capable of controlling display and/or brightness of an image displayed by a time display unit.

Some example embodiments may be related to a method for operating the watch to control display and/or brightness of an image displayed by the time display unit.

According to example embodiments, a watch, e.g., a hybrid smart watch, may include a display unit configured to display a time information set and an image/non-time information set and may include a controller configured to control the display unit. The display unit may include a time display unit configured to display the time information, a first circular polarizer disposed on the time display unit and rotated by the controller, an image display unit disposed on the first circular polarizer and configured to display the image information, and a second circular polarizer disposed on the image display unit.

In example embodiments, the first circular polarizer may include a first linear polarizer disposed on the time display unit and a first quarter wave retardation plate disposed on the first linear polarizer.

In example embodiments, the second circular polarizer may include a second quarter wave retardation plate disposed on the image display unit and a second linear polarizer disposed on the second quarter wave retardation plate.

In example embodiments, the image display unit may be a transparent display device.

In example embodiments, the controller may control a rotation angle of the first circular polarizer.

In example embodiments, the controller may be implemented as a rotation ring.

In example embodiments, the time display unit may be implemented as an analog-type watch that displays the time information with hands.

In example embodiments, the time display unit may be implemented as a digital-type watch that displays the time information with numerals.

In example embodiments, the image display unit may be turn on or turn off.

In example embodiments, a polarization axis of the first circular polarizer and a polarization axis of the second circular polarizer may form an angle greater than 0 degree and less than 90 degrees and the image display unit may turn off in a watch mode.

In example embodiments, a polarization axis of the first circular polarizer and a polarization axis of the second circular polarizer may be parallel and the image display unit turns on in an image mode.

In example embodiments, a polarization axis of the first circular polarizer and a polarization axis of the second circular polarizer may form an angle greater than 0 degree and less than 90 degrees and the image display unit may turn on in a dual mode.

According to example embodiments, a method for controlling a hybrid smart watch may include a step of turning on or turning off an image display unit and a step of controlling the transmittance and/or brightness of an image displayed by a time display unit disposed under the image display unit.

In example embodiments, the image display unit may be a transparent display device.

In example embodiments, the transmittance of the time display unit may be determined by controlling a rotation angle of a first circular polarizer disposed between the image display unit and the time display unit.

In example embodiments, the first circular polarizer may be coupled to a controller, and the first circular polarizer may be rotated by the controller.

In example embodiments, the controller may be implemented as a rotation ring.

In example embodiments, the a polarization axis of a first circular polarizer disposed between the image display unit and the time display unit and a polarization axis of a second circular polarizer disposed on the image display unit may form an angle greater than 0 degree and less than 90 degrees and the image display unit may turn off in a watch mode.

In example embodiments, a polarization axis of a first circular polarizer disposed between the image display unit and the time display unit and a polarization axis of a second circular polarizer disposed on the image display unit may be parallel and the image display unit may turn on in an image mode.

In example embodiments, a polarization axis of a first circular polarizer disposed between the image display unit and the time display unit and a polarization axis of a second circular polarizer disposed on the image display unit may form an angle greater than 0 degree and less than 90 degrees and the image display unit may turn on in a dual mode.

Example embodiments may be related to a watch. The watch may include a first display unit, a second display unit, a first polarizer set, and a second polarizer set. The second display unit may be positioned over the first display unit and may be transparent for transmitting light. One of the first display unit and the second display unit may display a time information image that indicates time. The other of the first display unit and the second display unit may display a non-time information image, e.g., a user interface element. The first polarizer set may be positioned between the first display unit and the second display unit. The second polarizer set may be positioned on the second display unit. One of the first polarizer set and the second polarizer set may rotate relative to the other (while remaining parallel to the first display unit) for enabling the watch to conceal or show the time information image.

The second display unit may be positioned between the first polarizer set and the second polarizer set.

The first polarizer set may rotate between the first display unit and the second display unit.

The second display unit may be positioned between the first display unit and the second polarizer set.

The watch may include a controller. The controller may surround a portion of the second display unit, may be connected to the one of the first polarizer set and the second polarizer set, and may control rotation of the one of the first polarizer set and the second polarizer set.

The first polarizer set may include a first linear polarizer and a first quarter wave retardation plate. The first quarter wave retardation plate may be positioned between the first linear polarizer and the second display unit. The second polarizer set may include a second quarter wave retardation plate and a second linear polarizer. The second quarter wave retardation plate may be positioned between the second display unit and the second linear polarizer.

The second polarizer set may include a quarter wave retardation plate and a linear polarizer. The quarter wave retardation plate may be positioned between the second display unit and the linear polarizer. The second display unit may be positioned between the first polarizer set and the quarter wave retardation plate.

The first display unit may display the time information image. The first polarizer set may have a first polarization axis. The second polarizer set may have a second polarization axis. The second polarizer set may conceal the time information image when the first polarization axis is parallel to the second polarization axis.

The first display unit may display the time information image. The first polarizer set may have a first polarization axis. The second polarizer set may have a second polarization axis. The second polarizer set may show the time information image with first brightness when the first polarization axis is perpendicular to the second polarization axis. The second polarizer set may show the time information image with second brightness when the first polarization axis is at an acute angle with respect to the second polarization axis. The second brightness may be less than the first brightness.

The first polarizer set may have a first polarization axis. The second polarizer set may have a second polarization axis. The second display unit may automatically turn on or turn off according to a size of an angle between the first polarization axis and the second polarization axis when the first display unit displays the time information image.

The first polarizer set may have a first polarization axis. The second polarizer set may have a second polarization axis. The second display unit may automatically turn on in response to a condition that the first polarization axis becomes parallel to the second polarization axis.

The first polarizer set may have a first polarization axis. The second polarizer set may have a second polarization axis. The second display unit may automatically turn off in response to a condition that the first polarization axis becomes not parallel to the second polarization axis.

The first polarizer set may have a first polarization axis. The second polarizer set may have a second polarization axis. The second display unit may automatically turn off in response to a condition that the first polarization axis becomes perpendicular to the second polarization axis.

Example embodiments may be related to a method for operating a watch. The method may include the following steps: using a first display unit of the watch to display a time information image that indicates time; and rotating a first polarizer set of the watch to conceal or show the time information image.

The method may include rotating the first polarizer set of the watch to adjust brightness of the time information image.

The method may include showing the time information image by rotating the first polarizer set of the watch to make a polarization axis of the first polarizer set of the watch not parallel to a polarization axis of a second polarizer set of the watch.

The method may include the following steps: using a second display unit of the watch to display a non-time information image that overlaps the time information image; and rotating the first polarizer set of the watch to trigger the second display unit of the watch to turn off.

The method may include the following steps: using a second display unit of the watch to display a non-time information image that overlaps the time information image; and triggering the second display unit of the watch to turn off by rotating the first polarizer set of the watch to make a polarization axis of the first polarizer set of the watch not parallel to a polarization axis of a second polarizer set of the watch.

The method may include the following steps: using a second display unit of the watch to display a non-time information image that overlaps the time information image; and triggering the second display unit of the watch to turn off by rotating the first polarizer set of the watch to make a polarization axis of the first polarizer set of the watch perpendicular to a polarization axis of a second polarizer set of the watch.

The method may include the following steps: triggering a second display unit of the watch to turn on and concealing the time information image by rotating the first polarizer set of the watch to make a polarization axis of the first polarizer set of the watch parallel to a polarization axis of a second polarizer set of the watch; and using the second display unit of the watch to display a non-time information image that overlaps the time information image.

According to embodiments, a watch, e.g., a multi-mode watch or hybrid smart watch, and a related operating method may control transmittance and/or brightness of an image displayed by a time display unit by changing a rotation angle of a circular polarizer. Thus, the watch may display only a non-time information image, only a time information image, or both of a non-time information image and a time information image that overlap each other, according to operation modes of the watch. Therefore, visibility of images displayed by the watch may be satisfactory in the operation modes.

DETAILED DESCRIPTION OF THE EMBODIMENTS

Embodiments are described with reference to the accompanying drawings.

Figure 1:
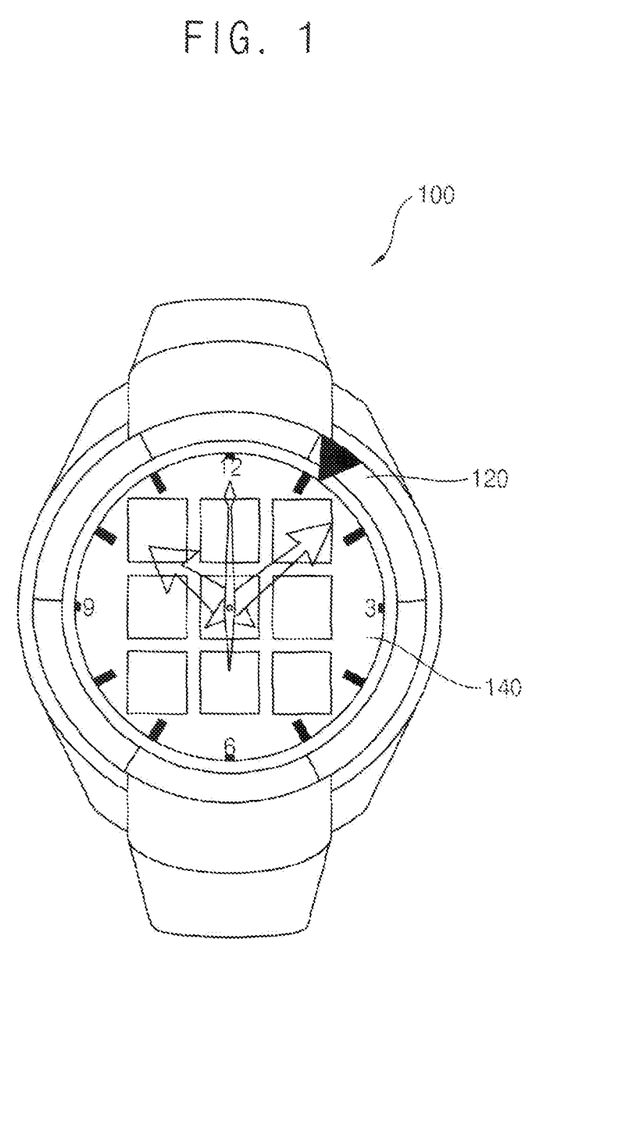
FIG. 1 is a diagram (e.g., a top view) illustrating a watch, e.g., a multi-mode watch or hybrid smart watch, according to example embodiments.
Figure 2A:
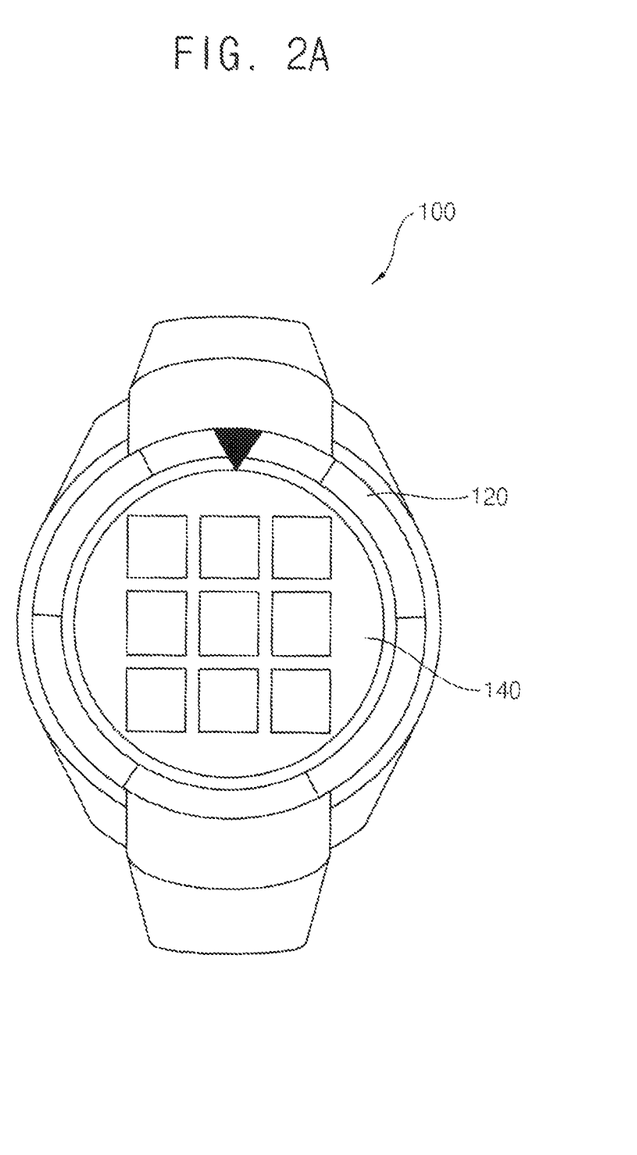
FIG. 2A, FIG. 2B, and FIG. 2C are diagrams illustrating f operations of the watch of FIG. 1 according to example embodiments.
Figure 2B:
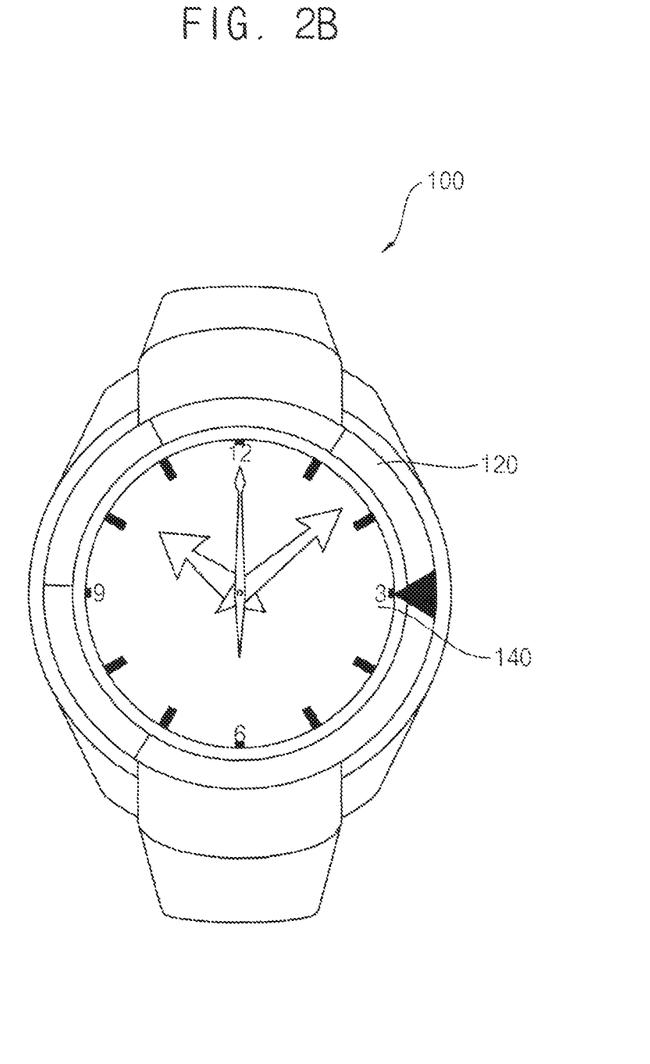
Figure 2C:
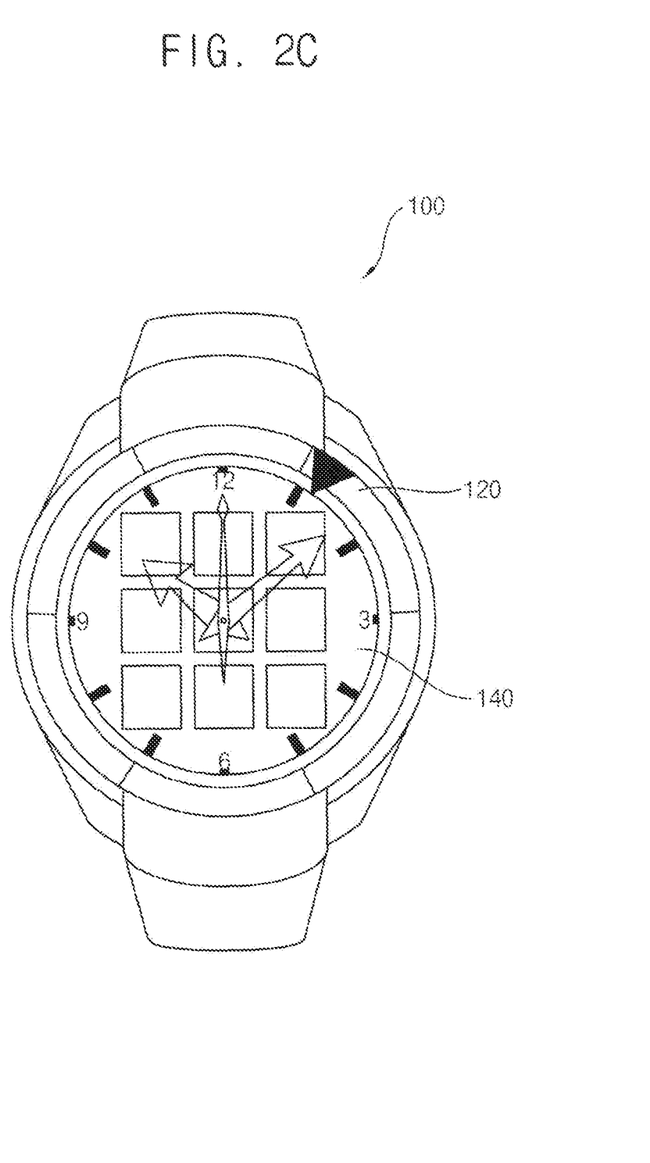

FIG. 1 is a diagram illustrating a watch, e.g., a hybrid smart watch, according to example embodiments. FIGS. 2A, 2B, and 2C are diagrams illustrating operations of the watch of FIG. 1 according to example embodiments.

Referring to FIG. 1, a hybrid smart watch 100 may include a display unit 140 and a controller 120.

The display unit 140 may display first-type information image (e.g. a time information image that shows current time) and a second-type information image (e.g., a non-time information image that shows icons/buttons for receiving user commends and/or shows results responsive to user commands). The display unit 140 of the hybrid smart watch 100 may display only the second-type information image (as illustrated in FIG. 2A), may display only the first-type information image (as illustrated in FIG. 2B), and may display both of the first-type information image and the second-type information image (as illustrated in FIG. 2C).

The controller 120 may operate the hybrid smart watch 100 in a second mode (e.g., an image mode), a first mode (e.g., a watch mode), and a dual mode by controlling the display unit 140. The controller 120 may control a transmittance of a time display unit by controlling a rotation angle of polarizer, e.g., a circular polarizer, included in the display unit 140. The transmittance of the time display unit changed by the rotation angle of the circular polarizer will be described in detail referring to FIGS. 5A and 5B. For example, the controller 120 may be a circular ring. In this case the hybrid smart watch 100 may be operated in an image mode, a watch mode, and a dual mode based on a rotation angle of the circular ring.

Referring to FIG. 2A, the hybrid smart watch 100 may be operated in the image mode according to the rotation angle of the circular polarizer controlled by the controller 120, which may be a rotation ring. The hybrid smart watch 100 may display the second-type information image on the display unit 140 in the image mode. In embodiments, the second-type information image may be displayed when the hybrid smart watch 100 functions as a mobile computing device. For example, the display unit 140 may display a user interface element (e.g., a menu screen) or an execution screen of an application as the second-type information image.

Referring to FIG. 2B, the hybrid smart watch 100 may be operated in the watch mode according to the rotation angle of the circular polarizer controlled by the controller 120, which may be a rotation ring. The hybrid smart watch 100 may display the first-type information image on the display unit 140 in the watch mode. For example, the display unit 140 may display the first-type information image to function as an analog-type watch or a digital-type watch.

Referring to FIG. 2C, the hybrid smart watch 100 may be operated in the dual mode according to the rotation angle of the circular polarizer controlled by the controller 120, which may be a rotation ring. The hybrid smart watch 100 may display both of the second-type information image and the first-type information image on the display unit 140 in the dual mode. In embodiments, the second-type information image and the first-type information image may overlap each other.

As described above, the hybrid smart watch 100 may selectively display the second-type information image or the first-type information image on the display unit 140 according to operations of the controller 120. Visibility of the hybrid smart watch 100 may be satisfactory in the image mode, the watch mode, and the dual mode.

In embodiments, the hybrid smart watch 100 may include at least one of a power unit that drives a time display unit and an image display unit in the watch 100, a communication unit that connects the hybrid smart watch 100 with other devices, and a camera that takes photos.

Figure 3:
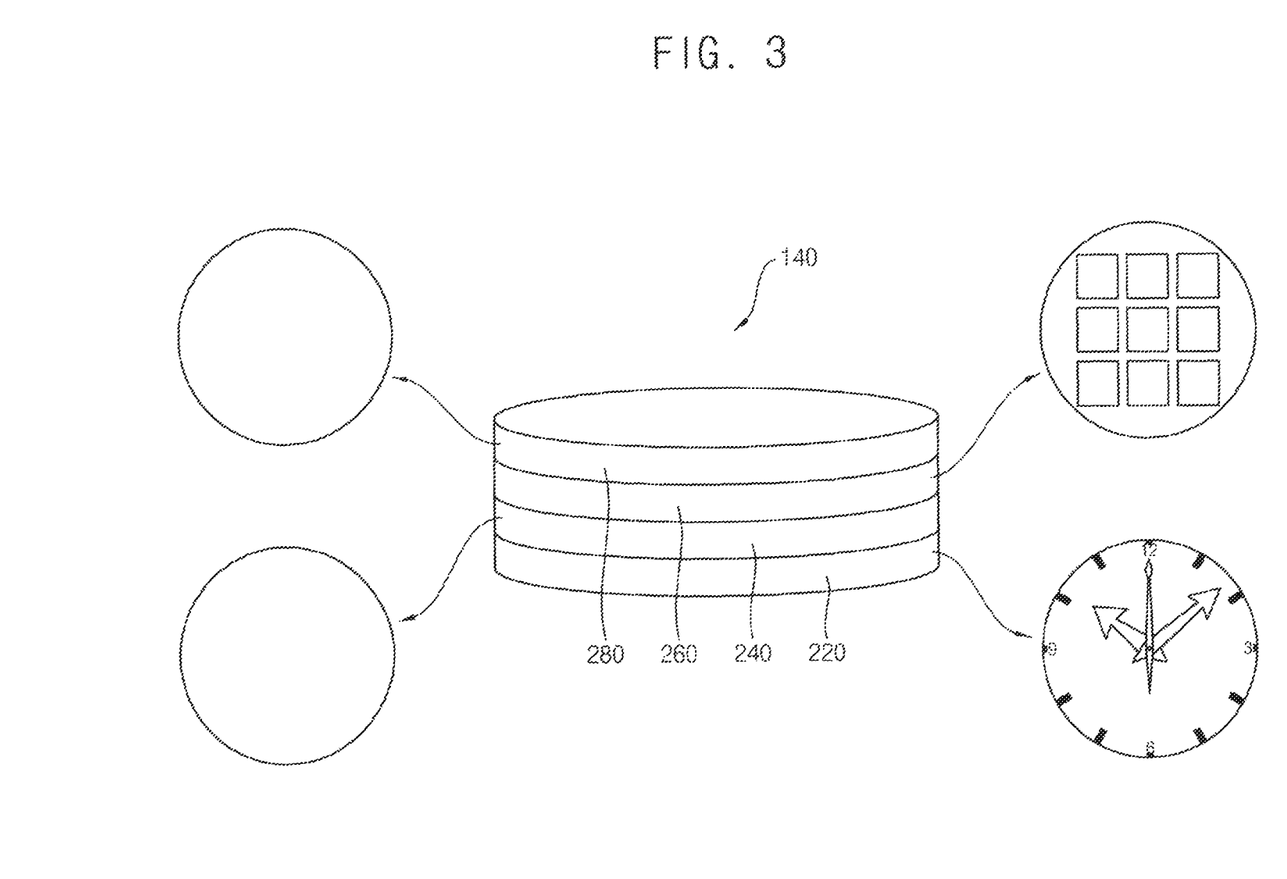
FIG. 3 is a diagram (e.g., a perspective view) illustrating a display unit included in the watch of FIG. 1 according to example embodiments.
Figure 4A:
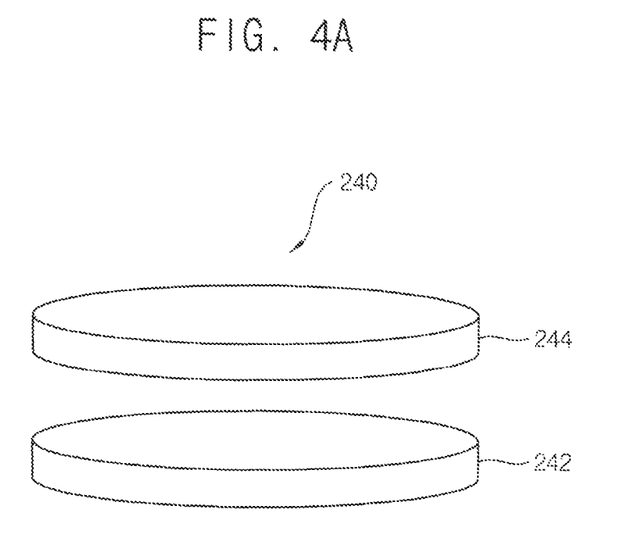
FIG. 4A is a diagram (e.g., a perspective view or an exploded view) illustrating s first polarizer, e.g., a first circular polarizer, included in the watch of FIG. 1 according to example embodiments.
Figure 4B:
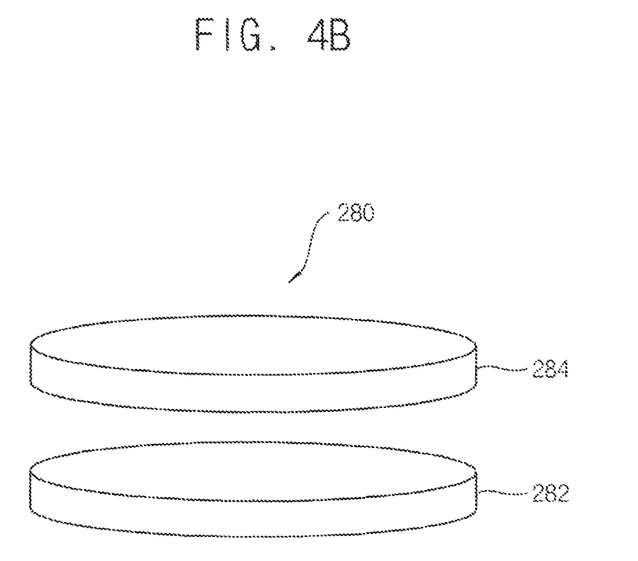
FIG. 4B is a diagram (e.g., a perspective view or an exploded view) illustrating a second polarizer, e.g., a second circular polarizer, included in the watch of FIG. 1 according to example embodiments.

FIG. 3 is a diagram illustrating a display unit 140 included in the watch 100 of FIG. 1 according to embodiments. FIG. 4A is a diagram illustrating a first polarizer, e.g., a first circular polarizer, included in the watch 100 of FIG. 1 according to embodiments. FIG. 4B is a diagram illustrating a second polarizer, e.g., a second circular polarizer, included in the watch 100 of FIG. 1 according to embodiments.

Referring to FIG. 3, the display unit 140 may include a first-type display unit (e.g., a time display unit 220), a first (circular) polarizer 240, a second-type display unit (e.g., an image display unit 260), and a second (circular) polarizer 280.

The time display unit 220 may display a first-type information image. In example embodiments, the time display unit 220 may display an analog-type watch and may display the first-type information image with hands that indicate hours, minutes, and seconds. In example embodiments, the time display unit 220 may display a digital-type watch and may display the first-type information image with numerals that indicate hours, minutes, and seconds. The first-type information image of the time display unit 220 may be displayed when the watch 100 is operated in a watch mode or a dual mode.

The first circular polarizer 240 may be disposed on the time display unit 220. The first circular polarizer 240 may be coupled to the controller 120 and may be rotated along with the controller 120. The first circular polarizer 240 may transmit light of which a direction is consistent with a polarization axis of the first circular polarizer 240. The first circular polarizer 240 may be coupled to the controller. The controller may change the direction of the polarization axis of the first circular polarizer 240 by controlling a rotation angle of the first circular polarizer according to an operation mode of the watch 100.

Referring to FIG. 4A, the first circular polarizer 240 may include a first linear polarizer 242 and a first quarter wave retardation plate 244. The first linear polarizer 242 may be disposed on the time display unit 220. The first linear polarizer 242 may transmit light of which direction is parallel to and/or consistent with a polarization axis of the first linear polarizer 242. For example, a light component reflected on the time display unit 220 and having a direction that is parallel with the polarization axis of the first linear polarizer 242 may be transmitted through the first linear polarizer 242. That is, light reflected on the time display unit 220 may output as a linearly polarized light that is parallel to the polarization axis of the first linear polarizer 242 from the first linear polarizer 242. The first quarter wave retardation plate 244 may retard the phase of the linearly polarized light from the first linear polarizer 242 by λ/4, i.e., a quarter of the wavelength of the linearly polarized light. Thus, the linearly polarized light from the first linear polarizer 242 may output as a circularly polarized light from the first quarter wave retardation plate 244.

The image display unit 260 may display the second-type information image. In embodiments, the second-type information image may be displayed when the watch 100 is operated as a mobile computing device. For example, the image display unit 260 may display a user interface element (e.g., a menu) or an execution screen of an application as the second-type information image. The menu may include application icons corresponding to at least one application and/or execution icons for executing predetermined function. The second-type information image of the image display unit 260 may be displayed when the watch 100 is operated in the image mode or the dual mode. The image display device 280 may be a transparent display device. In example embodiments, the image display unit 260 may be a transparent organic light emitting display device. In example embodiments, the image display unit 260 may be a transparent liquid crystal display device. The image display unit 260 may turn on or turn off according to the operation mode of the hybrid smart watch and/or operations performed by the user. When the image display unit 260 turns off, light may be transmitted through the image display unit 260 because the image display unit 260 is transparent. The image display unit 260 may further include a touch panel although not illustrated in FIG. 3.

The second circular polarizer 280 may be disposed on the image display unit 260. The second circular polarizer 280 may transmit light that is consistent with a polarization axis of the second circular polarizer 280. The second circular polarizer 280 may reduce reflection of external light that occurs on a surface of the image display unit 260.

Referring to 4B, the second circular polarizer 280 may include a second quarter wave retardation plate 282 and a second linear polarizer 284. The second quarter wave retardation plate 282 may be disposed on the image display unit 260. The second quarter wave retardation plate may retard a phase of the circularly polarized light from the first quarter wave retardation plate 244 by λ/4, i.e., a quarter of the wavelength of the circularly polarized light. Thus, the circularly polarized light from the first quarter wave retardation plate 244 may be output as a linearly polarized light from the second quarter wave retardation plate 282. The second linear polarizer 248 may be disposed on the second quarter wave retardation plate 282. The second linear polarizer 284 may transmit a light component of which the direction is parallel to and/or consistent with the polarization axis of the second linear polarizer 284. The second linear polarizer 284 may block a light component of which the direction is perpendicular to the polarization axis of the second linear polarizer 284. That is, the second linear polarizer 284 may transmit or block the light transmitted through the second quarter wave retardation plate 282 according to an angle of the linearly polarized light from the second quarter wave retardation plate 282.

As described above, the display unit 140 of the watch 100 may include the time display unit 220, the first circular polarizer 240, the image display unit 260, and the second circular polarizer 280. Light reflected on time display unit 220 may be transmitted or blocked by the first circular polarizer 240 and the second circular polarizer 280. The first-type information image of the time display unit 220 may be displayed on the display unit 140 when the light transmits the second circular polarizer 280. The first-type information image of the time display unit 220 may not be displayed on the display unit 140 when the light is blocked by the second circular polarizer 280.

Figure 5A:
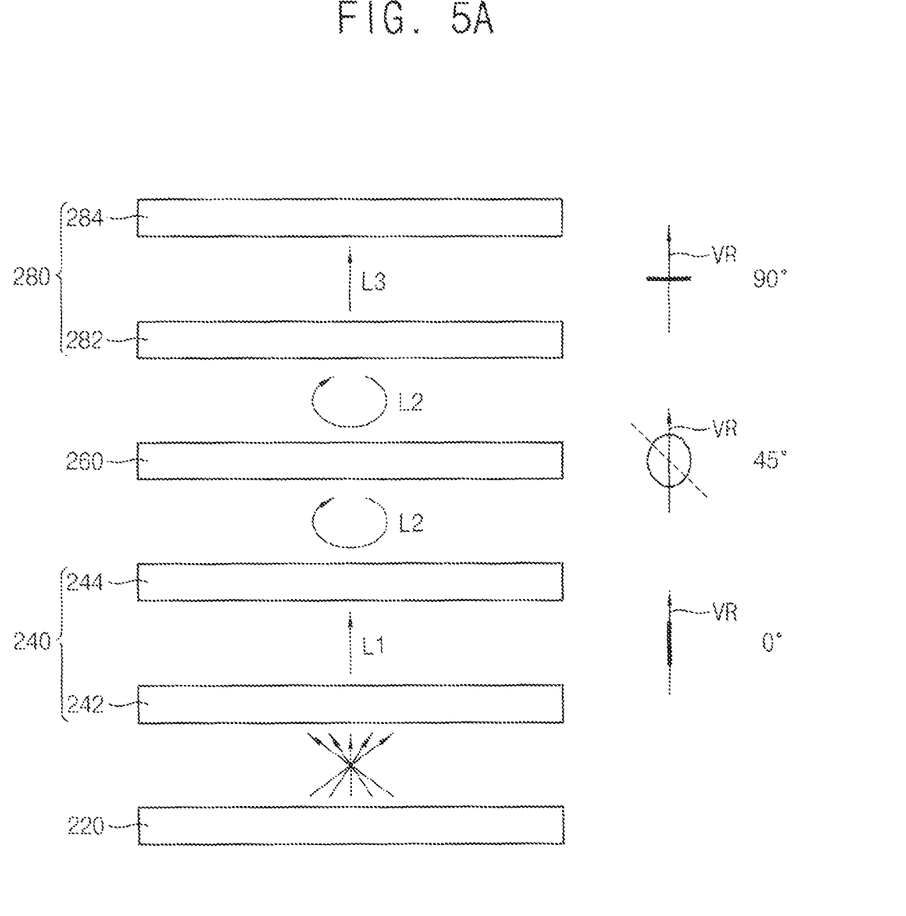
FIG. 5A and FIG. 5B are diagrams (e.g., side views) illustrating light paths according to operations of the watch of FIG. 1 according to example embodiments.
Figure 5B:
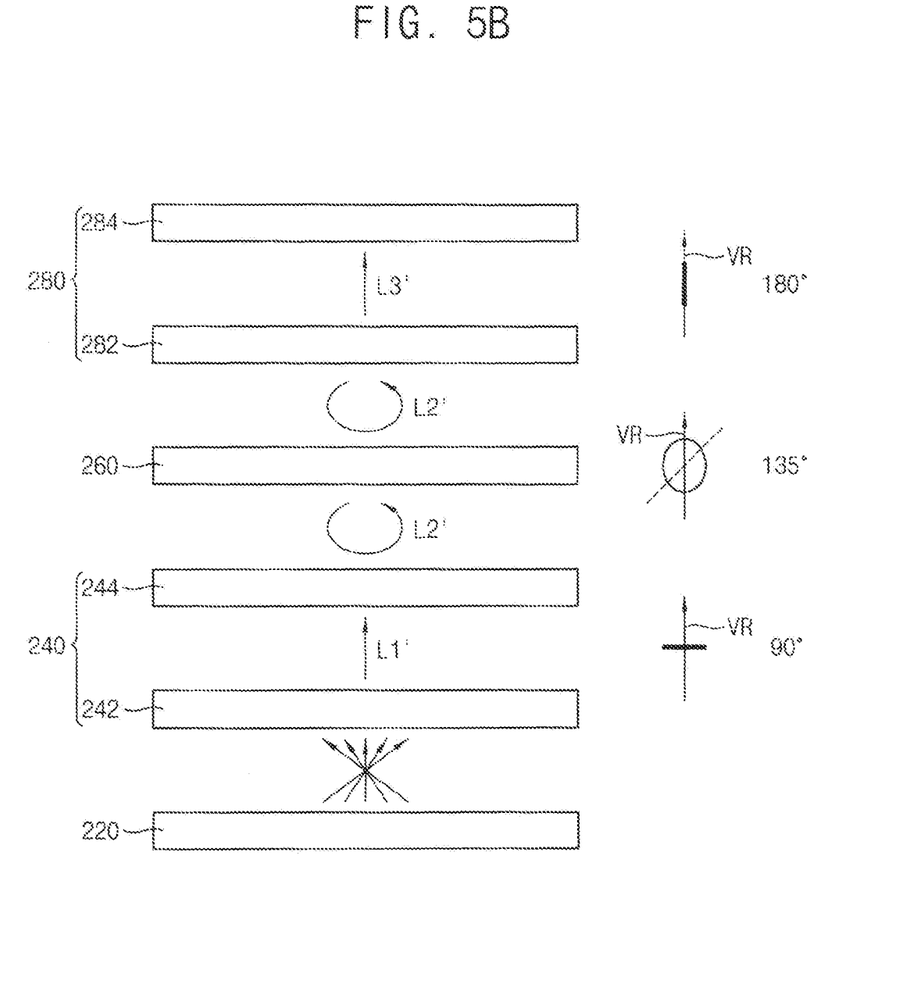

FIGS. 5A and 5B are diagrams illustrating light paths according to operations of the watch 100 of FIG. 1 according to embodiments.

Referring to FIG. 5A, no first-type information image (e.g., no time information image) may be displayed on the display unit 140 of the watch 100 in the image mode. FIG. 5A illustrates that the polarization axis of the first circular polarizer 240 is parallel to a virtual reference line VR and that the polarization axis of the second circular polarizer 280 is parallel to the virtual reference line VR. That is, the polarization axis of the first circular polarizer 240 and the polarization axis of the second circular polarizer 280 are parallel. Referring to FIG. 5A, light reflected on the time display unit 220 may be incident to the first linear polarizer 242. The light of which the direction is parallel with the polarization axis of the first linear polarizer 242 may be transmitted through the first linear polarizer 242. For example, given that the polarization axis of the first linear polarizer 242 and a virtual reference line VR are parallel, a first light L1 may output through the first linear polarizer 242. The first light L1 may be a linearly polarized light of which the direction is at 0 degree with respect to the virtual reference line VR. The first light L1 output from the first linear polarizer 242 may be incident to the first quarter wave retardation plate 244 of the first circular polarizer 240. The first quarter wave retardation plate 244 may retard the phase of the first light L1 by λ/4. The first light L1 may be converted to a second light L2 transmitted from the first quarter wave retardation plate 244. The second light L2 may be a circularly polarized light of which the direction is at 45 degrees with respect to the virtual reference line VR. The second light L2 may be transmit through the transparent image display unit 260 and may be incident to the second quarter wave retardation plate 282 of the second circular polarizer 280. The second quarter wave retardation plate 282 may retard the phase of the second light L2 by λ/4. The second light L2 may be converted to a third light L3 transmitted from the second quarter wave retardation plate 282. The third light L3 may be a linearly polarized light of which the direction is at 90 degrees with respect to the virtual reference line VR. The third light L3 output from the second quarter wave retardation plate 282 may be blocked by the second linear polarizer 284 because the polarization axis of the second linear polarizer 284 is parallel to the virtual reference line VR. That is, the third light L3 of which the direction is at 90 degrees with respect to the virtual reference line VR may be blocked by the second linear polarizer 284 of which the polarization axis is parallel to the virtual reference line VR. Therefore, the first-type information image of the time display unit 220 may not be displayed on the display unit 140 of the watch 100. In embodiments, when the image display unit 260 turns on, the display unit 140 of the watch 100 may display only the second-type information image (e.g., a user interface element and/or an application execution result image).

Referring to FIG. 5B, a first-type information image (e.g., a time information image) may be displayed on the display unit 140 of the watch 100 in the watch mode or the dual mode. FIG. 5B illustrates that the polarization axis of the first circular polarizer 240 is perpendicular to a virtual reference line VR and that the polarization axis of the second circular polarizer 280 is parallel to the virtual reference line VR. That is, the polarization axis of the first circular polarizer 240 is perpendicular to the polarization axis of the second circular polarizer 280. In embodiments, the polarization axis of the first circular polarizer 240 may be changed by a rotation. Referring to FIG. 5B, light reflected on the time display unit 220 may be incident to the first linear polarizer 242 of the first circular polarizer 240. The light of which the direction is parallel to the polarization axis of the first linear polarizer 242 may be transmitted through the first linear polarizer 242. For example, given that the polarization axis of the first linear polarizer 242 is perpendicular to the virtual reference line VR, a first light L1' may output through the first linear polarizer 242. The first light L1' may be a linearly polarized light of which the direction is at 90 degrees with respect to the virtual reference line VR. The first light L1' output from the first linear polarizer 242 may be incident to the first quarter wave retardation plate 244 of the first circular polarizer 240. The first quarter wave retardation plate 244 may retard a phase of the first light L1' by Δ/4. The first light L1' may be converted to a second light L2' transmitted from the first quarter wave retardation plate 244. The second light L2' may be a circularly polarized light of which the direction is at 135 degrees with respect to the virtual reference line VR. The second light L2' may be transmitted through the transparent image display unit 260 and may be incident to the second quarter wave retardation plate 282 of the second circular polarizer 280. The second quarter wave retardation plate 280 may retard the phase of the second light L2' by λ/4. The second light L2' may be converted to a third light L3' transmitted from the second quarter wave retardation plate 282. The third light L3' may be a linearly polarized light of which the direction is at 180 degrees with respect to the virtual reference line VR. The third light L3' output from the second quarter wave retardation plate 282 may be transmitted through the second linear polarizer 284 because the polarization axis of the second linear polarizer 284 is parallel to the virtual reference line VR. That is, the third light L3' of which the direction is at 180 degrees with respect to the virtual reference line VR may be transmitted through the second linear polarizer 284 of which the polarization axis is parallel to the virtual reference line VR. Thus, the first-type information image (e.g., the time information image) of the time display unit 220 may be displayed on the display unit 140 of the watch 100. In embodiments, if the image display unit 260 turns/is off, the display unit 140 of the watch 100 may display only the first-type information image (e.g., time information). In case that the image display unit 260 turns/is on, the display unit 140 of the watch 100 may display both of the first-type information image and the second-type information image.

Although embodiments wherein the polarization axis of the first circular polarizer 240 and the polarization axis of the second circular polarizer 280 form an angle of 0 degree and an angle of 90 degrees are described as examples, the angle between the polarization axis of the first circular polarizer 240 and the polarization axis of the second circular polarizer 280 may have other values. For example, the polarization axis of the first circular polarizer 240 and the polarization axis of the second circular polarizer 280 may form an angle of 45 degrees. In embodiments, the polarization axis of the first circular polarizer 240 may form an angle of 45 degrees with the virtual reference line VR, and the polarization axis of the second circular polarizer 280 may be parallel to the virtual reference line VR. A first light that is transmitted through the first linear polarizer 242 may be a linearly polarized light of which the direction forms an angle of 45 degrees with the virtual reference line VR. The first light may be converted to a second light that is a circularly polarized light of which the direction forms an angle of 90 degrees with the virtual reference line VR and is transmitted from the first quarter wave retardation plate 242. Further, the second light may be converted to a third light that is a linearly polarized light of which the direction forms an angle of 135 degrees with the virtual reference line VR and is transmitted from the second quarter wave retardation plate 282. Part of the third light L3 may be transmitted through the second linear polarizer 248 because the polarization axis of the second linear polarizer 248 is parallel to the virtual reference line VR and the third light forms an angle of 135 degrees with the virtual reference line VR. Thus, a transmittance for the first-type image (e.g., time information image) of the time display unit 220 may be reduced compared with the case that the polarization axis of the first circular polarizer 240 is perpendicular to the polarization axis of the second circular polarizer 280. In embodiments, when the image display unit 260 turns/is off, the display unit 140 of the watch 100 may display only the first-type information image (e.g., the time information) with reduced brightness. In embodiments, when the image display unit 260 turns/is on, the display unit of the hybrid smart watch may display both of the first-type information image (with reduced brightness) and the second-type information image.

As described above, the second circular polarizer may transmit or block the light reflected on the time display unit 220 according to the rotation angle of the first circular polarizer 240. Thus, display of the first-type image displayed by the time display unit may be controlled.

Figure 6:
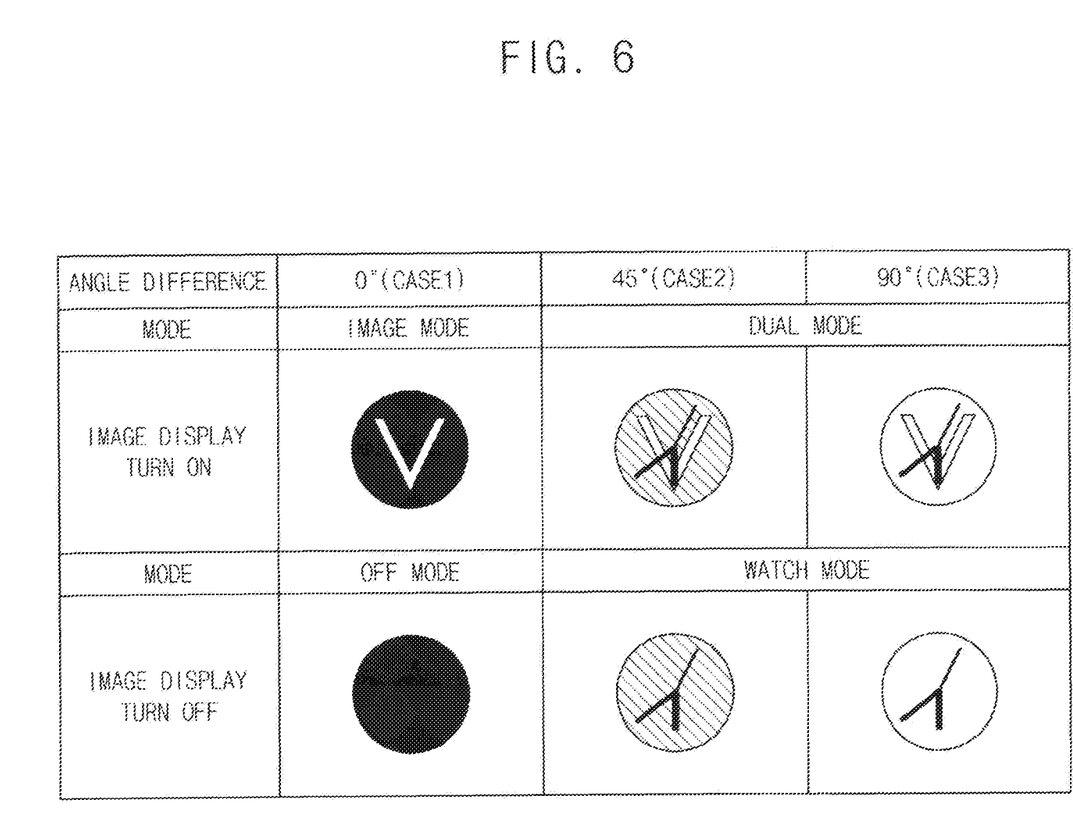
FIG. 6 is a diagram illustrating operations of the watch of FIG. 1 according to example embodiments.

FIG. 6 is a diagram illustrating operations of the watch 100 according to embodiments.

Referring to FIG. 6, the watch 100 may be operated in the watch mode, the image mode, and the dual mode according to sizes (e.g., degrees) of the angle between the polarization axis of the first circular polarizer 240 and the polarization axis of the second circular polarizer 280 in a top view of the watch 100. The sizes of the angle may be controlled by rotation of the first circular polarizer 240.

When the polarization axis of the first circular polarizer 240 is parallel to the polarization axis of the second circular polarizer 280 (CASE 1), i.e., when the angle between the polarization axes is 0 degree, the light reflected on the time display unit 220 may be blocked by the second circular polarizer, and the first-type information image (e.g., a time information image) may not be displayed on the display unit 140. In CASE 1, when the image display unit turns/is on, the watch 100 may be operated in the image mode, in which the second-type information image (e.g., a non-time information image) is displayed on the display unit 140. When the image display unit turns/is off in CASE 1, no first-type information image and no second-type information image may be displayed on the display unit 140 of the watch 100.

When the polarization axis of the first circular polarizer forms an angle of 45 degrees with the polarization axis of the second polarizer (CASE 2), part of the light reflected on the time display unit may be transmitted through the second circular polarizer, and the first-type information image (e.g., a time information image) may be displayed on the display unit. The transmittance/brightness of the first-type information image displayed by the time display unit may be reduced compared with the case that the polarization axis of the first circular polarizer is perpendicular to the polarization axis of the second circular polarizer. In CASE 2, when the image display unit turns/is on, the watch may be operated in the dual mode in, which the first-type information image (with reduced brightness) and the second-type information image (e.g., a non-time information image) are displayed on the display unit. When the image display unit turns/is off in CASE 2, the watch may be operated in the watch mode, in which the first-type information image (with reduced brightness) is displayed on the display unit.

When the polarization axis of the first circular polarizer is perpendicular to the polarization axis of the second polarizer (CASE 3), i.e., when the angle between the polarization axes is 90 degrees, the light reflected on the time display unit may be transmitted through the second circular polarizer, and the first-type information image (e.g., a time information image) may be displayed on the display unit. In CASE 3, when the image display unit turns/is on, the watch may be operated in the dual mode, in which the first-type information image (e.g., a time information image) and the second-type information image (e.g., a non-time information image) are displayed on the display unit. When the image display unit turns/is off in CASE 3, the watch may be operated in the watch mode, in which the first-type information image is displayed on the display unit.

As described above, the transmittance/brightness of the first-type information image (e.g., a time information image) displayed by the time display unit may be controlled by changing the size of the angle between polarization axes of the first circular polarizer and the second circular polarizer according to the operation modes of the watch. In embodiments, at least one of the first circular polarizer and the second circular polarizer (e.g., the first circular polarizer) is coupled to the controller 120, and the controller 120 may control the size of the angle by controlling the rotation of the first circular polarizer and/or the second circular polarizer.

Figure 7:
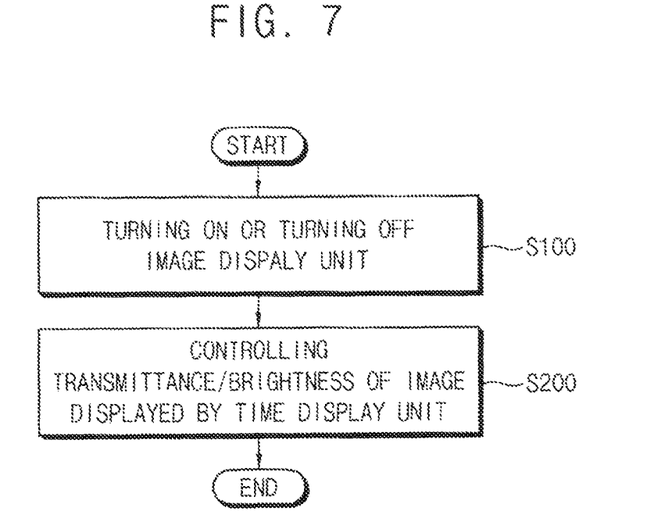
FIG. 7 is a flowchart illustrating a method for operating a watch, e.g., a hybrid smart watch, according to example embodiments.
Figure 8:
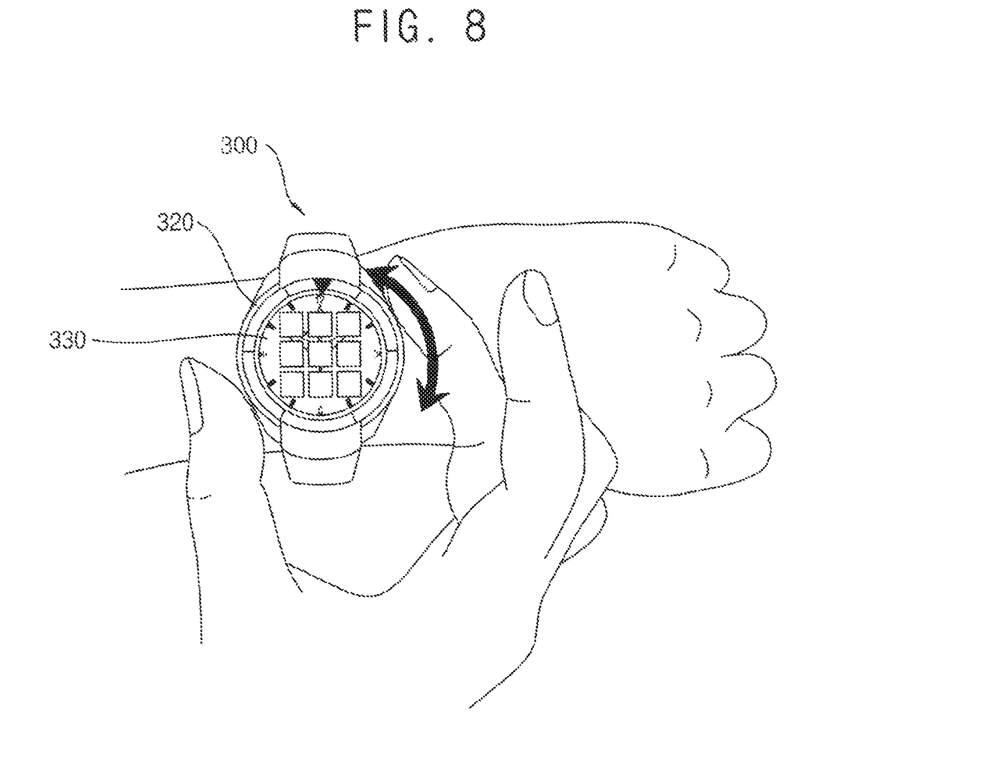
FIG. 8 is a diagram illustrating a method for operating a watch according to example embodiments.

FIG. 7 is a flowchart illustrating a method for operating a watch, e.g., a hybrid smart watch, according to example embodiments. FIG. 8 is a diagram illustrating an operation of the method for controlling the watch according to example embodiments.

Referring to FIG. 7, the method may include turning on or turning off an image display unit (in step S100) and may include controlling the transmittance/brightness of an image displayed by a time display unit disposed under the image display unit (in step S200).

The hybrid smart watch may include a display unit and a controller. The display unit may include the time display unit and the image display unit. The time display unit may be disposed at a bottom of the display unit and may display a first-type information image (e.g., a time information image that indicates time). A first circular polarizer may be disposed on the time display unit. The first circular polarizer may transmit light reflected on the time display unit according to of a polarization axis of the first circular polarizer. The first circular polarizer may control transmission of the light by rotation relative to a second circular polarizer. The first circular polarizer may be coupled to a controller. The controller may control the rotation angle of the first circular polarizer. The image display unit may be a transparent display device. In example embodiments, the image display unit may be an organic light emitting display device. In example embodiments, the image display unit may be a liquid crystal display device. The image display unit may turn on or turn off according to an operation mode of the hybrid smart watch or according to operation by the user. The second circular polarizer may be disposed on the image display unit. The second circular may control the transmittance/brightness of the image displayed by the time display unit by transmitting, partially transmitting, or blocking the light output from the first circular polarizer.

The method may include turning on or turning off the image display unit (in step S100). The hybrid smart watch may further include a switch that turns on or turns off the image display unit. In embodiments, the hybrid smart watch may further include an electronic device that automatically turns on or turns off the image display unit according to the operation mode of the watch and/or according to the size of the angle between the polarization axis of the first circular polarizer and the polarization axis of the second circular polarizer.

The method may include controlling the transmittance and/or brightness of a time information image displayed by the time display unit (in step S200). The controller of the hybrid smart watch may be coupled to the first circular polarizer. The controller may control the rotation angle of the first circular polarizer. For example, the controller 320 of the hybrid smart watch 300 may be a rotation ring as illustrated in FIG. 8. The display unit 330 of the watch 300 may have structures and elements analogous to and/or identical to structures and elements in the display unit 140 of the watch 100 discussed above. In embodiments, the user may rotate the first circular polarizer in the display unit 330 by rotating the rotation ring. Transmission of the light reflected on the time display unit may be changed according to the rotation angle of the first circular polarizer. The second circular polarizer may transmit, partially transmit, or block the light output through the first circular polarizer. Thus, the transmission of the image displayed by the time display unit may be controlled.

The hybrid smart watch may be operated in an image mode, a watch mode, and a dual mode. In some example embodiments, when the hybrid smart watch is operated in the image mode, the polarization axis of the first circular polarizer may be parallel to the polarization axis of the second circular polarizer, and the image display unit may automatically turn on. In this case, the light reflected on the time display unit may be blocked by the second circular polarizer. Thus, the display unit of the hybrid smart watch may display only the second-type information image (e.g., a non-time information image). In example embodiments, when the hybrid smart watch is operated in the watch mode, the polarization axis of the first circular polarizer and the polarization axis of the second circular polarizer may form an angle greater than 0 degree and less than 90 degrees, and the image display unit may automatically turn off. In this case, the light reflected on the time display unit may be transmitted through the second circular polarizer. Thus, the display unit of the hybrid smart watch may display the first-type information image (e.g., a time information image). The transmittance and/or brightness of the image displayed by the time display unit may be changed by the rotation angle of the first circular polarizer. In example embodiments, when the hybrid smart watch is operated in the dual mode, the polarization axis of the first circular polarizer and the polarization axis of the second circular polarizer may form an angle greater than 0 degree and less than 90 degrees, and the image display unit may automatically turn on. In this case, the light reflected on the time display unit may be transmitted through the second circular polarizer. Thus, the display unit of the hybrid smart watch may display both of the first-type information image and the second-type information image. The transmittance and/or brightness of the image displayed by the time display unit may be changed by the rotation angle of the first circular polarizer.

As described above, the hybrid smart watch may operate in the image mode, the watch mode, and the dual mode by turning on or turning off the image display unit and controlling the transmittance/brightness of the image displayed by the time display unit.

Embodiments may be applied to a display device and an electronic device having the display device. For example, embodiments may be applied to one or more of a computer monitor, a laptop, a digital camera, a cellular phone, a smart phone, a smart pad, a television, a personal digital assistant (PDA), a portable multimedia player (PMP), a MP3 player, a navigation system, a game console, a video phone, etc.

The foregoing is illustrative of example embodiments and is not to be construed as limiting thereof. Although a few example embodiments have been described, those skilled in the art will readily appreciate that many modifications are possible in the example embodiments. All such modifications are intended to be included within the scope defined in the claims.

What is claimed is:

1. A watch comprising:
   a first display unit;
   a second display unit positioned over the first display unit and configured to transmit light, wherein at least one of the first display unit and the second display unit is configured to display a time information image that indicates time;
   a first polarizer set positioned between the first display unit and the second display unit; and
   a second polarizer set positioned on the second display unit, wherein one of the first polarizer set and the second polarizer set is configured to rotate relative to another of the first polarizer set and the second polarizer set, wherein the second polarizer set comprises a quarter wave retardation member and a linear polarizing member, wherein the quarter wave retardation member is positioned between the second display unit and the linear polarizing member, and wherein the second display unit is positioned between the first polarizer set and the quarter wave retardation member.

2. The watch of claim 1, wherein the first polarizer set is configured to rotate between the first display unit and the second display unit.

3. The watch of claim 1, wherein the second display unit is positioned between the first display unit and the second polarizer set, wherein a top area of the second display unit is larger than a half of a top area of the first display unit, and wherein the top area of the first display unit is larger than a half of the top area of the second display unit.

4. The watch of claim 1 comprising: a controller surrounding a portion of the second display unit, connected to the one of the first polarizer set and the second polarizer set, and configured to control rotation of the one of the first polarizer set and the second polarizer set.

5. The watch of claim 1, wherein the first polarizer set comprises a first linear polarizer and a first quarter wave retardation plate, and wherein the first quarter wave retardation plate is positioned between the first linear polarizer and the second display unit.

6. The watch of claim 5, wherein the second display unit is positioned between the first quarter wave retardation plate and the quarter wave retardation member, and wherein the first quarter wave retardation plate and the quarter wave retardation member are positioned between the first linear polarizer and the linear polarizing member.

7. The watch of claim 1, wherein the first display unit is configured to display the time information image, wherein the first polarizer set has a first polarization axis, wherein the second polarizer set has a second polarization axis, and wherein the second polarizer set is configured to conceal the time information image when the first polarization axis is parallel to the second polarization axis.

8. The watch of claim 1, wherein the first display unit is configured to display the time information image, wherein the first polarizer set has a first polarization axis, wherein the second polarizer set has a second polarization axis, and wherein the second polarizer set is configured to show the time information image with first brightness when the first polarization axis is perpendicular to the second polarization axis.

9. The watch of claim 8, wherein the second polarizer set is configured to show the time information image with second brightness when the first polarization axis is at an acute angle with respect to the second polarization axis, and wherein the second brightness is less than the first brightness.

10. The watch of claim 1, wherein the first polarizer set has a first polarization axis, wherein the second polarizer set has a second polarization axis, and wherein the second display unit is configured to automatically turn on or turn off according to a size of an angle between the first polarization axis and the second polarization axis when the first display unit displays the time information image.

11. The watch of claim 1, wherein the first polarizer set has a first polarization axis, wherein the second polarizer set has a second polarization axis, and wherein the second display unit is configured to automatically turn on in response to a condition that the first polarization axis becomes parallel to the second polarization axis.

12. The watch of claim 1, wherein the first polarizer set has a first polarization axis, wherein the second polarizer set has a second polarization axis, and wherein the second display unit is configured to automatically turn off in response to a condition that the first polarization axis becomes not parallel to the second polarization axis.

13. The watch of claim 1, wherein the first polarizer set has a first polarization axis, wherein the second polarizer set has a second polarization axis, and wherein the second display unit is configured to automatically turn off in response to a condition that the first polarization axis becomes perpendicular to the second polarization axis.

14. A method for operating a watch, the method comprising:
   using a first display unit of the watch to display a time information image that indicates time; and
   rotating a first polarizer set of the watch to conceal or show the time information image, wherein the first polarizer set comprises a first linear polarizer and a first quarter wave retardation plate, wherein the watch further comprises a second polarizer set, wherein the second polarizer set comprises a second quarter wave retardation plate and a second linear polarizer, and wherein the first quarter wave retardation plate and the second quarter wave retardation plate are positioned between the first linear polarizer and the second linear polarizer.

15. The method of claim 14 comprising:
   rotating the first polarizer set of the watch to adjust brightness of the time information image.

16. The method of claim 14 comprising:
   showing the time information image by rotating the first polarizer set of the watch to make a polarization axis of the first polarizer set of the watch not parallel to a polarization axis of the second polarizer set of the watch.

17. The method of claim 14 comprising:

using a second display unit of the watch to display a non-time information image that overlaps the time information image; and rotating the first polarizer set of the watch to trigger the second display unit of the watch to turn off.

18. The method of claim 14 comprising:

using a second display unit of the watch to display a non-time information image that overlaps the time information image; and triggering the second display unit of the watch to turn off by rotating the first polarizer set of the watch to make a polarization axis of the first polarizer set of the watch perpendicular to a polarization axis of the second polarizer set of the watch.

19. The method of claim 14 comprising:

triggering a second display unit of the watch to turn on and concealing the time information image by rotating the first polarizer set of the watch to make a polarization axis of the first polarizer set of the watch parallel to a polarization axis of the second polarizer set of the watch; and using the second display unit of the watch to display a non-time information image that overlaps the time information image.

20. A watch comprising:

a first display unit;

a second display unit positioned over the first display unit and configured to transmit light, wherein at least one of the first display unit and the second display unit is configured to display a time information image that indicates time;

a first polarizer set having a first polarization axis and positioned between the first display unit and the second display unit;

a second polarizer set having a second polarization axis and positioned on the second display unit, wherein one of the first polarizer set and the second polarizer set is configured to rotate relative to another of the first polarizer set and the second polarizer set; and an electronic device configured to automatically turn on or turn off the second display unit according to a size of an angle between the first polarization axis and the second polarization axis when the first display unit displays the time information image.

* * * * *